(12) United States Patent
Chapman (10) Patent No.: US 9,057,481 B1
(45) Date of Patent: Jun. 16, 2015

(54) CAMERA PEDESTAL

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 14/135,122

(22) Filed: Dec. 19, 2013

(51) Int. Cl.
*B62B 3/00* (2006.01)
*F16M 11/42* (2006.01)
*B62B 3/10* (2006.01)

(52) U.S. Cl.
CPC ............. *F16M 11/42* (2013.01); *B62B 3/102* (2013.01)

(58) Field of Classification Search
CPC   B60B 33/0055; B60B 33/0057; B62B 3/001; B62B 3/008; B62B 11/00; B62B 2301/06
USPC .......... 180/47.11, 47.34, 98, 99; 16/18 R, 20, 16/35 R, 35 D
See application file for complete search history.

(56) References Cited

U.S. PATENT DOCUMENTS

| | | | |
|---|---|---|---|
| 1,778,167 A * | 10/1930 | Roe ............................... | 16/35 R |
| 2,995,380 A | 8/1961 | King | |
| 4,950,120 A | 8/1990 | Barnes | |
| 5,197,700 A | 3/1993 | Chapman | |
| 5,318,313 A * | 6/1994 | Chapman ................... | 280/47.11 |
| 5,516,070 A | 5/1996 | Chapman | |
| 5,697,757 A | 12/1997 | Lindsay | |
| 5,730,450 A | 3/1998 | Chapman | |
| 5,820,088 A | 10/1998 | Chapman | |
| 6,050,575 A | 4/2000 | Lindsay | |
| 6,073,903 A | 6/2000 | Lindsay | |
| 6,135,465 A | 10/2000 | Chapman | |
| 6,520,642 B1 | 2/2003 | Chapman | |
| 6,520,645 B2 | 2/2003 | Yamamoto et al. | |
| 6,572,059 B1 | 6/2003 | Chapman | |
| 6,626,117 B1 | 9/2003 | Chapman | |
| 7,658,359 B2 | 2/2010 | Jones et al. | |
| 7,845,602 B1 | 12/2010 | Young et al. | |

OTHER PUBLICATIONS

Chapman/Leonard Studio Equipment, Inc., 2008-2010 Catalog, pp. 1, 72-73, 77, 80-82, and 100.
Vinten Camera Support Systems, Jan. 2013 Catalog, pp. 1, 25, and 34-37.
United States Patent and Trademark Office, Non-final Office Action issued in U.S. Appl. No. 14/186,444 (Dec. 8, 2014).

* cited by examiner

*Primary Examiner* — Hau Phan
*Assistant Examiner* — Bryan Evans
(74) *Attorney, Agent, or Firm* — Kenneth H. Ohriner; Perkins Coie LLP (57) ABSTRACT

A camera pedestal has wheels that can be positively steered via a steering bar operating a corrective and crab mode steering system, and that may also be uncoupled from the steering system and operated in a caster wheel mode. The pedestal includes a base having a chassis and four leg assemblies. Each leg assembly has an upper component rotatably attached to the chassis, and wheels attached to a lower component via a caster fitting. The caster fitting allows the wheels to be positioned in a normal position where they are aligned with the rotation axis of the leg assembly, and into a caster position where the wheels are offset from the rotation axis, to allow for caster rolling movement.

15 Claims, 12 Drawing Sheets

CAMERA PEDESTAL

BACKGROUND OF THE INVENTION

Video, television, and motion picture cameras must often be positioned in a particular way for a video or film sequence. The camera must also move to follow an action sequence or obtain a desired cinematographic effect. Generally, all movement of the camera must be uniform and smooth without any bumping, rocking, tilting, vibration or other movement that will cause the recorded images to jump when viewed on a screen. A camera pedestal or camera dolly is used to provide smooth camera movement.

Conventional camera dollies having steering systems which positively steer the wheels of the dolly via the operator turning a steering bar or handle. Conventional camera pedestals typically have caster wheels and are simply pushed in the desired direction of travel. Each design, positive steering and caster wheels, may have greater advantages, depending on the movement the camera operator is trying to achieve. Accordingly, improved camera pedestals are needed. However, engineering design challenges remain in providing improved camera pedestals.

BRIEF DESCRIPTION OF THE DRAWINGS

In the drawings the same element number indicates the same element in each of the views.

DETAILED DESCRIPTION

Figure 1:
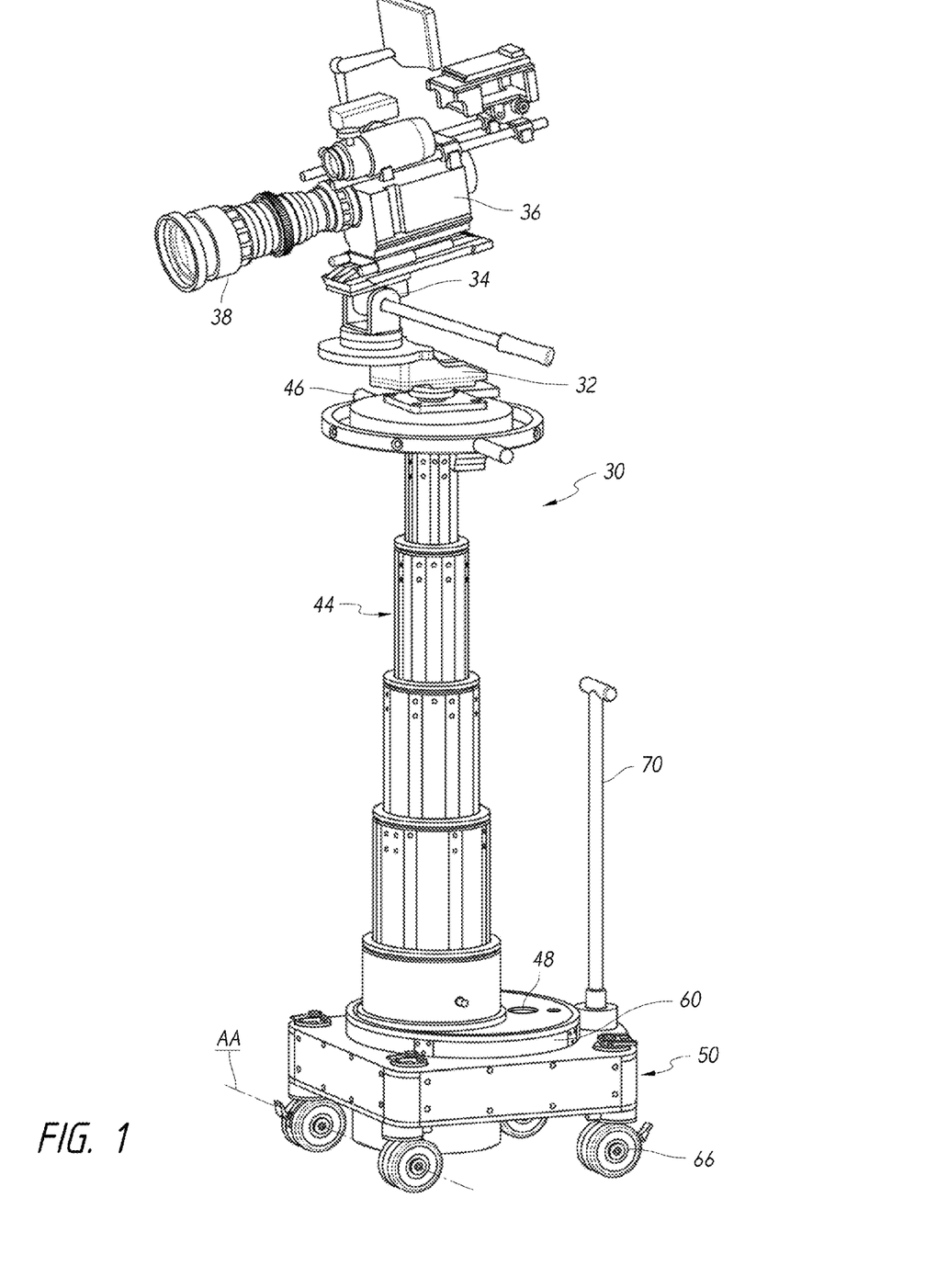
FIG. 1 is a perspective view of a camera pedestal.

As shown in FIG. 1, a camera pedestal 30 includes a base 50 which rolls on wheels. A telescoping column 44 may be removably supported on or in the base 50, with a tank 48 at the lower end of the column 44 positioned within a ring 60 of the base 50. The column may be provided as described in U.S. Pat. Nos. 5,197,700; 5,516,070 or 5,820,088, incorporated herein by reference. Similarly, various alternative telescoping columns, including electrically powered and mechanically weight compensated columns may be used. The base 50 may alternatively be used with a fixed height column or riser, for example with the base 50 having a flat closed top deck with no ring 60. That is the base 50 may alternatively be used as a camera dolly, with a boom arm, seating accessories, etc.

In a typical set up as shown in FIG. 1, a swing head 32 is mounted on the column platform 46. A pan-tilt head 34 is attached onto the swing head 32, and a camera 36 having a lens 38 is attached to the pan-tilt head 34. Of course the type of heads used on the pedestal, if any, will vary depending the on use contemplated.

Figure 2:
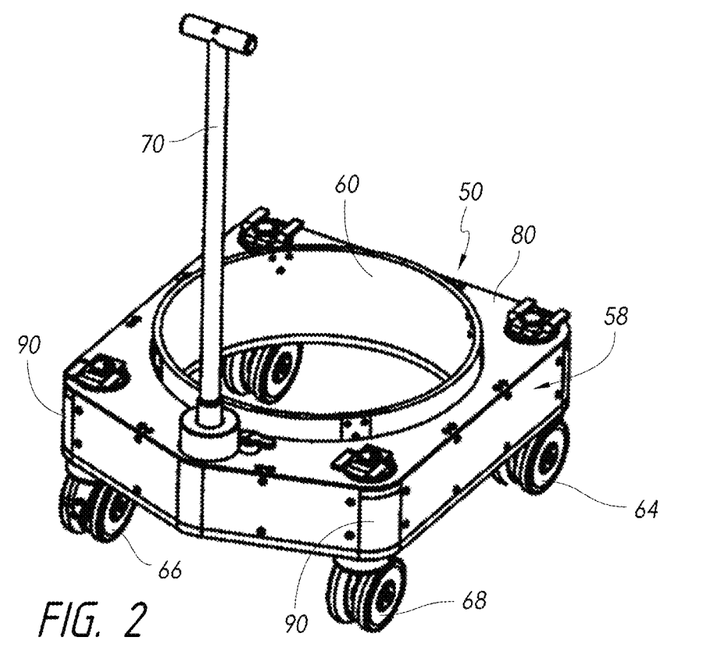
FIG. 2 is a perspective view of the base of the camera pedestal of FIG. 1 shown separately.
Figure 3:
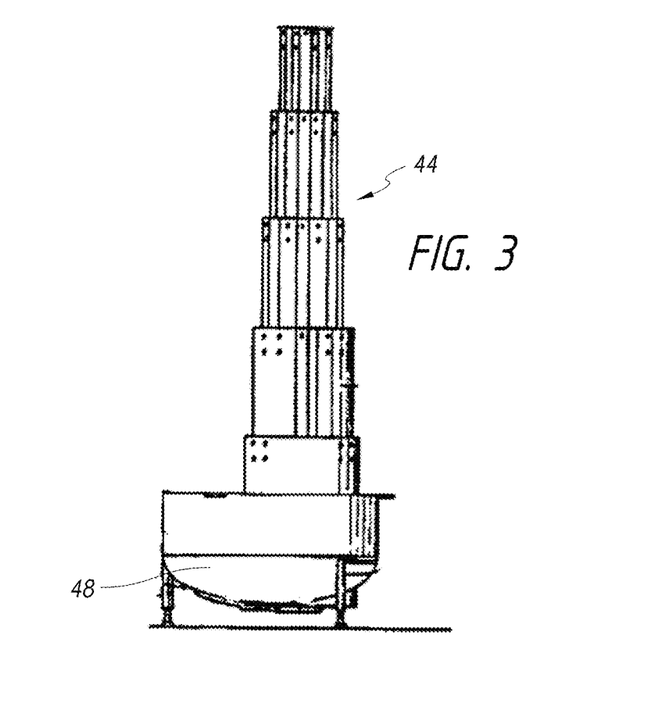
FIG. 3 is a side view of the column of the camera pedestal of FIG. 1 shown separately.

FIG. 2 shows the base 50 with the column 44 removed. As shown in FIG. 3 the column 44 may be removed from the base 50 and used alone. The base 50 modified to cover or omit the central opening within the ring 60, may also be used alone, or used apart from any column.

Figure 4:
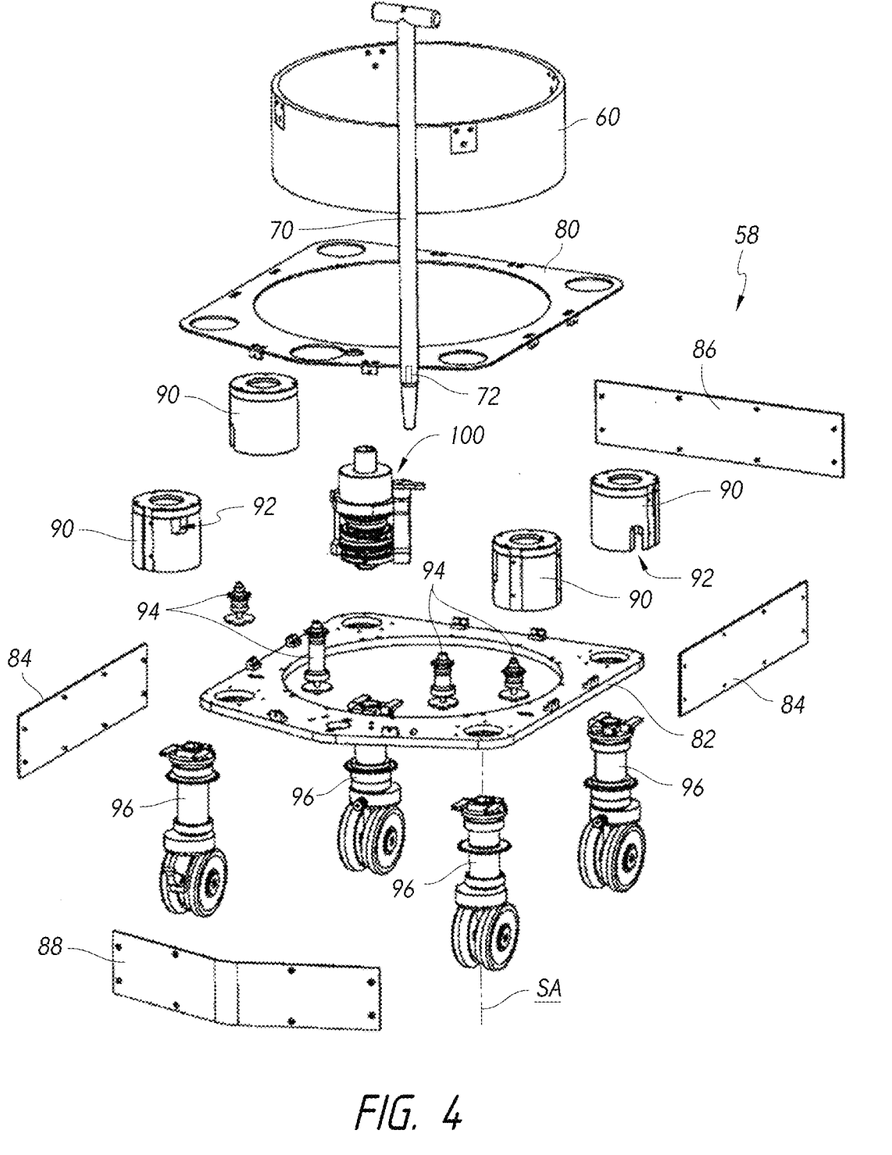
FIG. 4 is an exploded perspective view of the base shown in FIG. 2, with the steering chains removed for clarity of illustration.

Referring to FIG. 4, the base 50 may be constructed with a top plate 80 supported on sprocket housings 90 position near the corners of a bottom plate 82, with side plates 84, a rear plate 88 and a front plate 86 forming an enclosed chassis 58. As shown in FIG. 2, the outside cylindrical surface of each of the sprocket housings 90 may have relieved sections or slots to allow the plates 84, 86 and 88 to fit near flush, with the sprocket housings 90 providing structural attachment for the plates 84, 86 and 88, as well as for the top and bottom plates. Each of the four sprocket housings 90 may have the same design, except for the positions of the chain slots 92 further described below.

Figure 10:
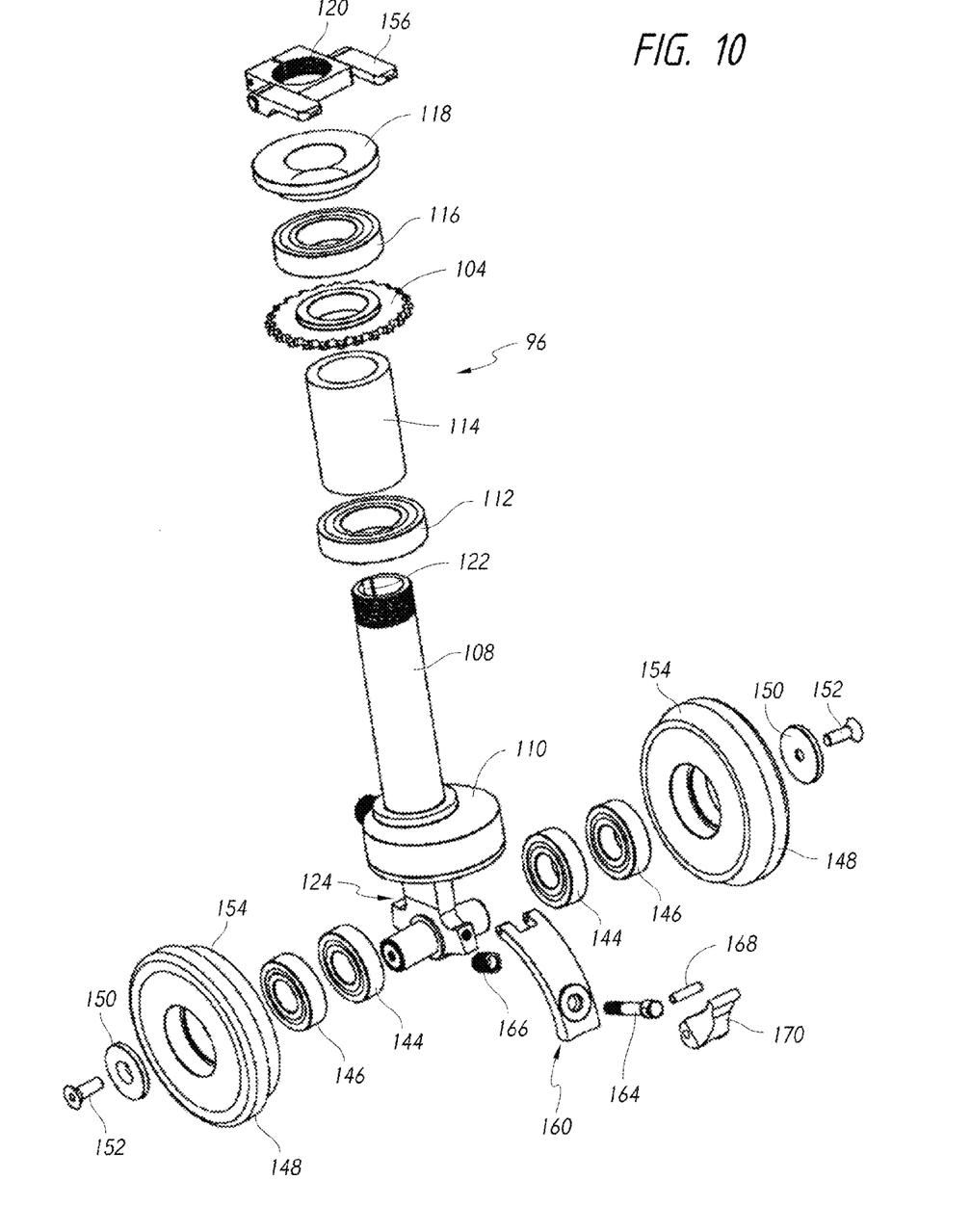
FIG. 10 is an exploded perspective view of the entire leg assembly shown in FIG. 5.
Figure 11:
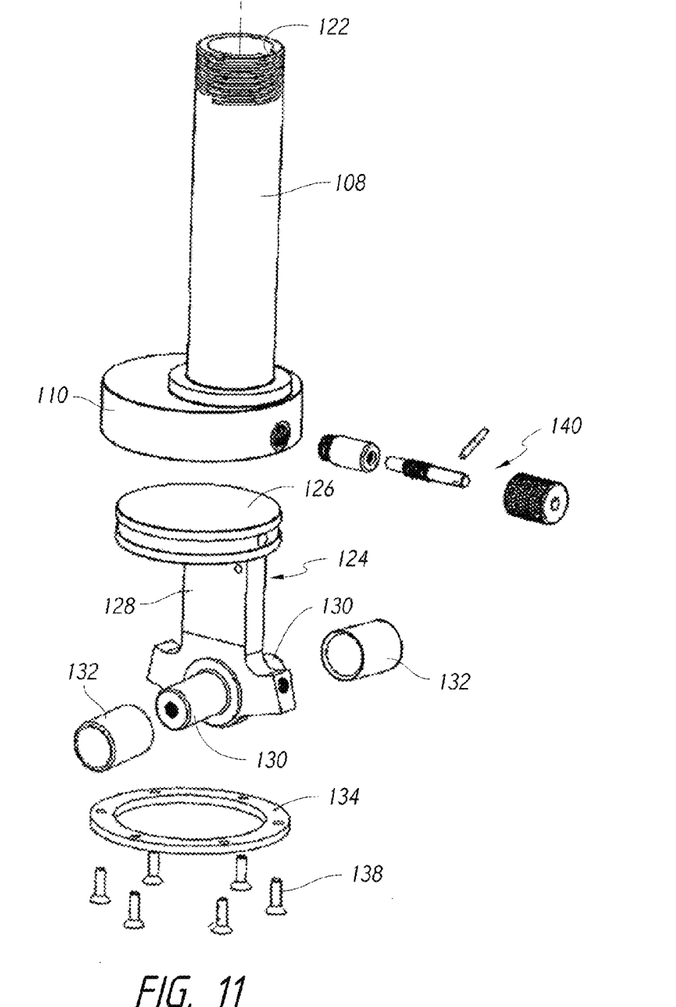
FIG. 11 is an exploded perspective view of the leg assembly shown in FIG. 10 with the axle frame separated from the riser, and with components omitted, for purpose of illustration.

Turning now to FIGS. 4-11, a leg assembly 96 is provided near each corner of the chassis 58. As shown in FIG. 11, each leg assembly 96 may include a riser 108 having an externally threaded upper end, optionally with a keyway 122 in the inner cylindrical wall of the riser 108. The riser may be joined to a cup 110. An axle frame 124 has a disk 126 rotatably positioned within the cup 110, with an offset arm 128 joined to the bottom side of the disk 126, at an off center position. Axles 130 on the arm 128 may extend down at a slight angle. Each leg assembly 96 is rotatable about a steering axis SA extending centrally and vertically through the leg assembly 96.

Referring still to FIG. 11, a retainer ring 134 and bolts 138 may retain the disk 126 within the cup 110. A fastener, such as a pin or bolt may be used to temporarily allow rotational movement between the axle frame and the riser, to shift between normal and caster mode configurations. The drawings show a thumbscrew 140 threaded into one side of the cup 110 for this purpose. When the thumbscrew 140 is loosened, the axle frame 124 can be rotated within the cup 110, to change the alignment between the riser 108 and the offset arm 128.

As shown in FIG. 11, a hardened axle sleeve 132 may be pressed onto each axle 130, with a wheel 148 mounted on inner and outer bearings 144 and 146 on the axle 130. A wheel bolt 152 and cap 150 may be used to secure the wheel 148 in place. As shown in FIG. 10, a brake assembly 160 may be provided on each leg assembly 96, or more typically on the rear left and rear right leg assemblies. If used, the brake assembly 160 may be provided with a brake arm 162 pivotally attached to the axle frame 124, with a spring 166 pushing the brake arm 162 up and away from the wheels 148. A brake lever 170 having a cam surface is pivotally attached to the head of a bolt 164 via a pin 164, with the bolt 164 threaded into the axle frame 124. With the lever 170 in the up position, the spring 166 holds the arm 162 up and out of contact with the inner surface 154 of the wheels 148, so that the wheels roll freely. The brake is actuated by pushing the lever 170 down causing the bottom surface of the lever 170 to forcibly contact the inner surface 154 of the wheel 148, preventing the wheel from rolling. The lever 170 may be foot-operated.

Figures 5, 6:
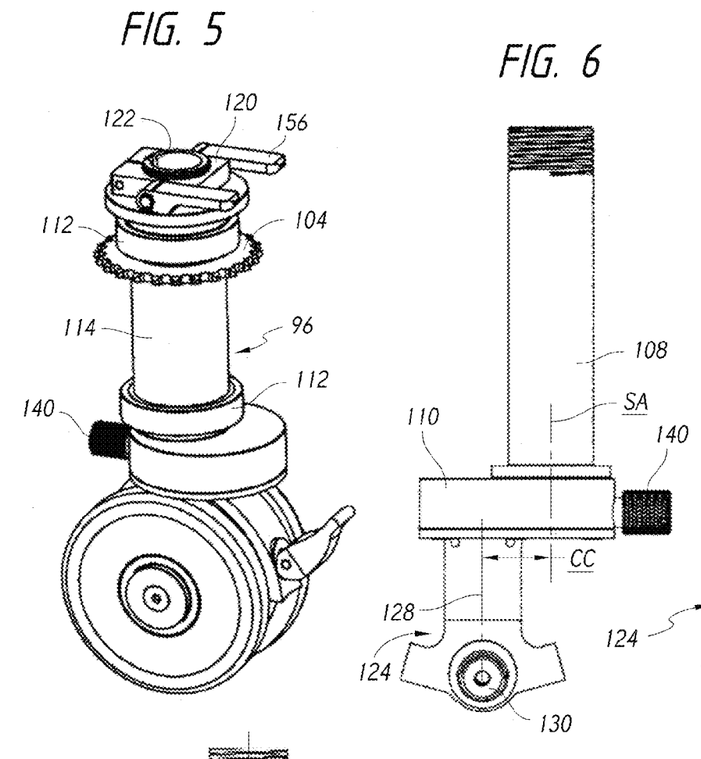
FIG. 5 is a perspective view of one of the leg assemblies of the base as shown in FIG. 4.
FIG. 6 is a side view of the leg assembly of FIG. 5 in the caster position, with components omitted for purpose of illustration.
Figure 7:
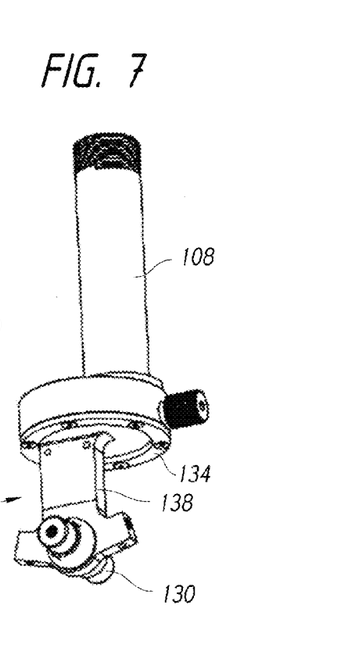
FIG. 7 is a perspective view of the leg assembly shown in FIG. 6.
Figure 12:
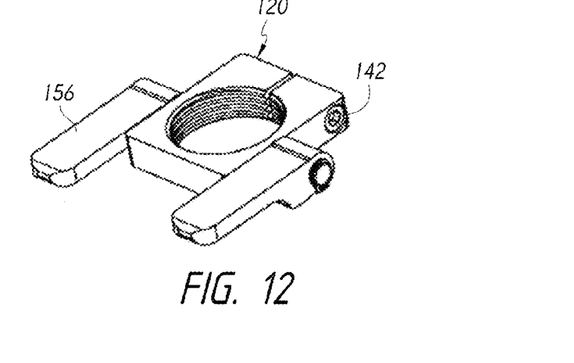
FIG. 12 is a perspective view of the cam lock shown in FIGS. 1, 2, 5 and 10.

Referring to FIGS. 5, 10 and 12, a lower bearing 112, a sleeve 114, a leg sprocket 104, an upper bearing 116 and a pressure plate 118 are provided on the riser 108. During assembly a cam lock 120 is threaded down onto the top end of the riser 108 to a position where it securely holds together the components on the riser 108. A cross bolt 142 is then tightened clamping the split collar of the cam lock 120 onto the riser 108. Referring to FIG. 10, with the tabs or levers 156 of the cam lock 120 in the down position, the cam lock 120 presses the pressure plate 118 down clamping the inner races of the bearings 112 and 116 against the sprocket 104, locking the sprocket 104 to the riser 108. Turning movement of the sprocket 104 then necessarily rotates the entire leg assembly 96 during use. With the levers 156 in the up position, the sprocket 104 is released, allowing the leg assembly 96 to rotate independently of the sprocket 104.

The four leg assemblies 96 may have the same design, except for the vertical position of the leg sprocket, and with the rear leg assemblies also shown with brakes 160. Although wheel pairs are shown in the drawings, the base may also be designed with a single wheel on each leg assembly. As used here, wheel set means a single wheel or dual wheels as shown. FIG. 5 shows the rear left leg assembly having leg sprocket 104. The other leg sprockets are the rear right sprocket 106 on the rear right leg assembly, the front leg sprockets 102 on the left and right front leg assemblies.

Turning to FIGS. 13, 14, 25 and 26, the base 50 may be provided with a steering system generally designated 52 having a steering transmission 100 and chains connecting transmission sprocket assemblies 188, 220 and 240 in the transmission 100 with the leg sprockets 102, 104 and 106 on the leg assemblies 96. The transmission 100 may be contained within a housing 180 having a cap 182 extending up through an opening at a rear central position of the top plate 80 of the base chassis 58, with side plates 210 of the housing 180 bolted onto the bottom plate 82.

Figure 13:
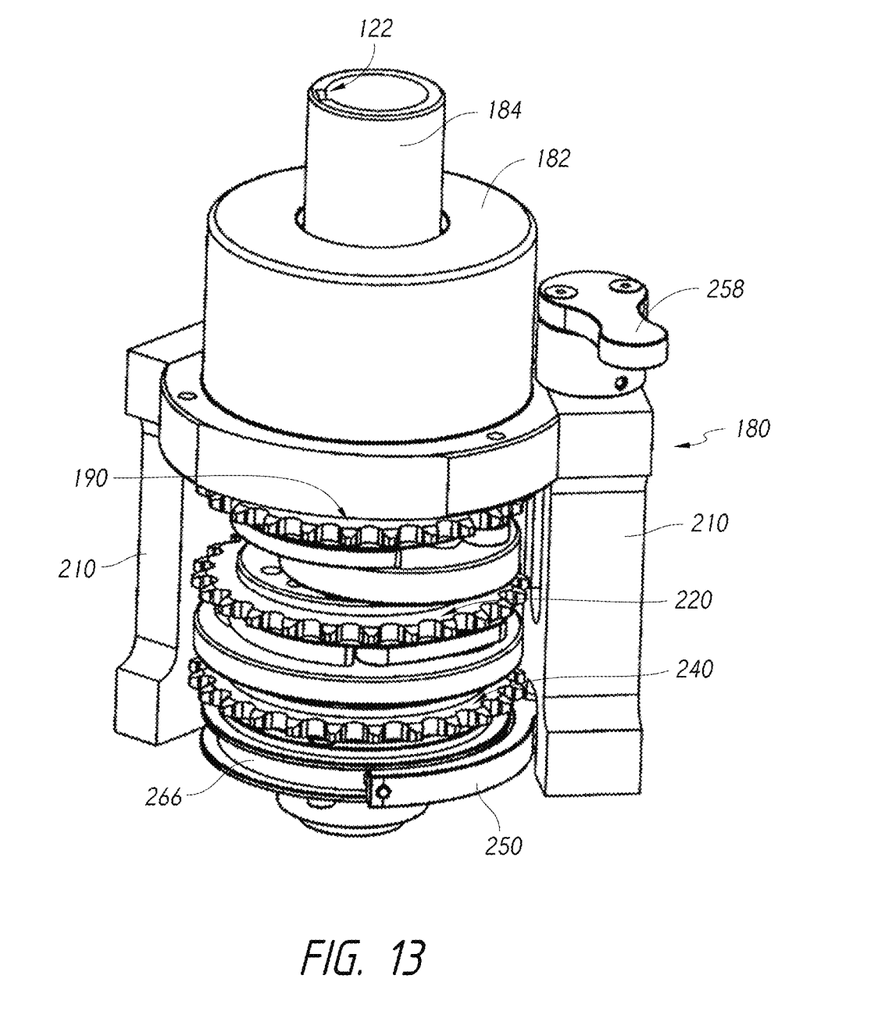
FIG. 13 is a perspective view of the steering transmission shown in FIG. 4.
Figure 14:
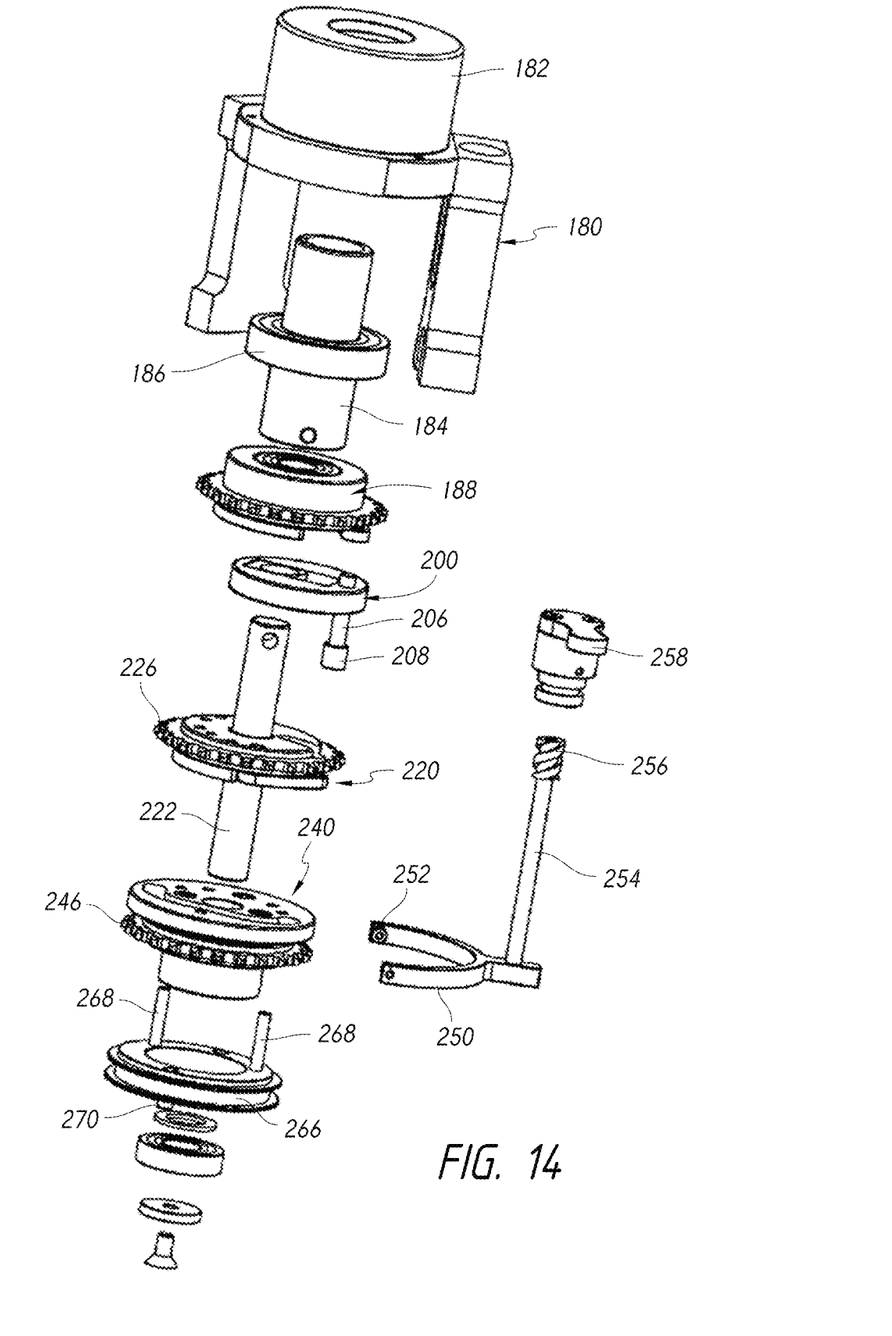
FIG. 14 is an exploded perspective view of the steering transmission shown in FIG. 13.

The steering transmission may have an axle 222 passing centrally through top, middle and bottom sprocket assemblies. As shown in FIGS. 14 and 18, the axle is rigidly attached to a shaft 184 via an axle pin 224. The top end of the shaft 184 may extend up through the cap 182, as shown in FIGS. 1 and 13. Referring back to FIG. 16, bearings 192 on or in the top sprocket assembly 188 allow the top sprocket 190 to rotate freely on the axle 222, and allow the shaft 184 to rotate freely within the transmission housing 180.

Figure 15:
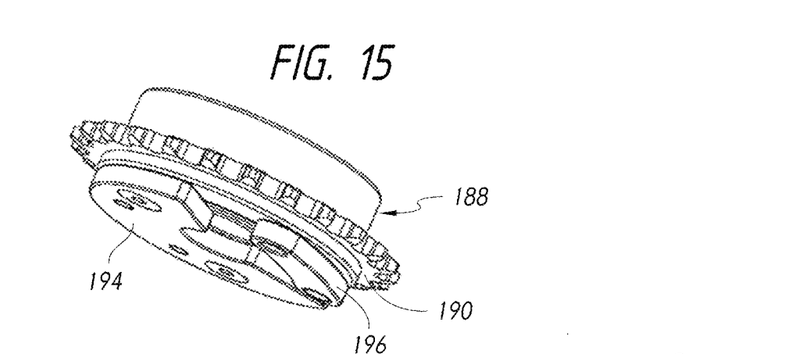
FIG. 15 is a perspective view of the top sprocket assembly shown in FIG. 14.
Figure 16:
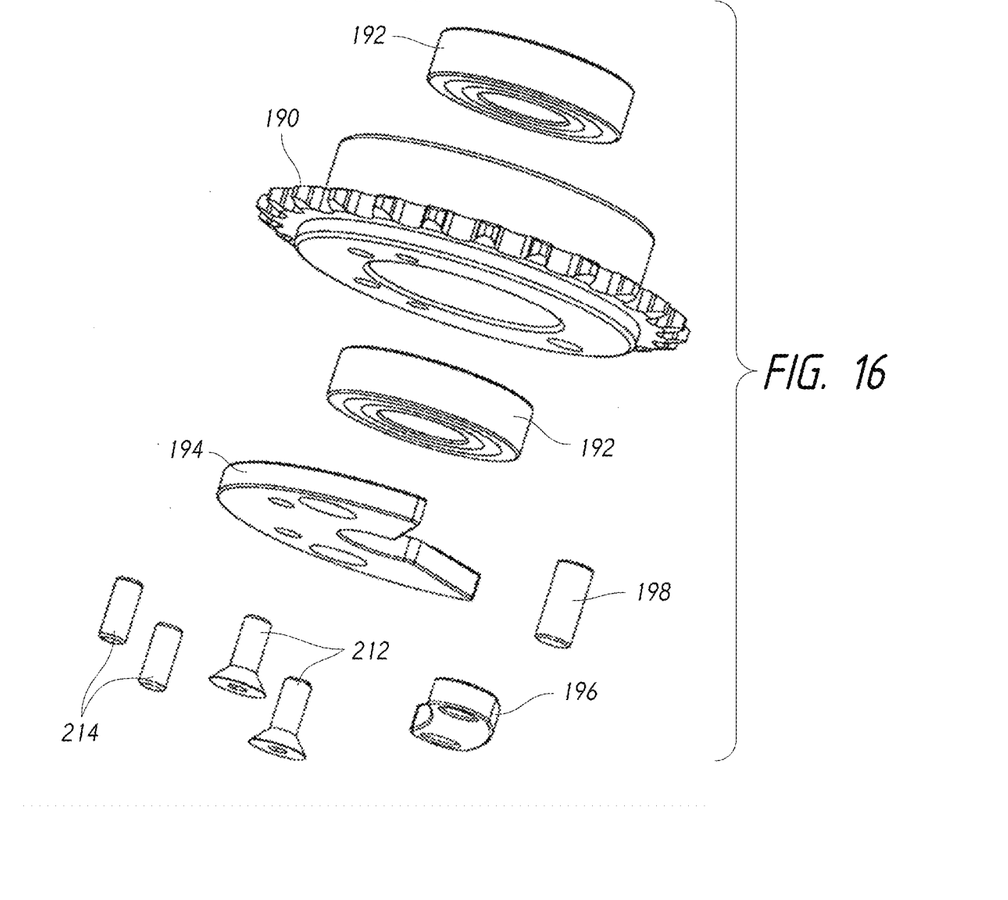
FIG. 16 is an exploded perspective view of the top sprocket assembly shown in FIG. 15.
Figures 17, 18:
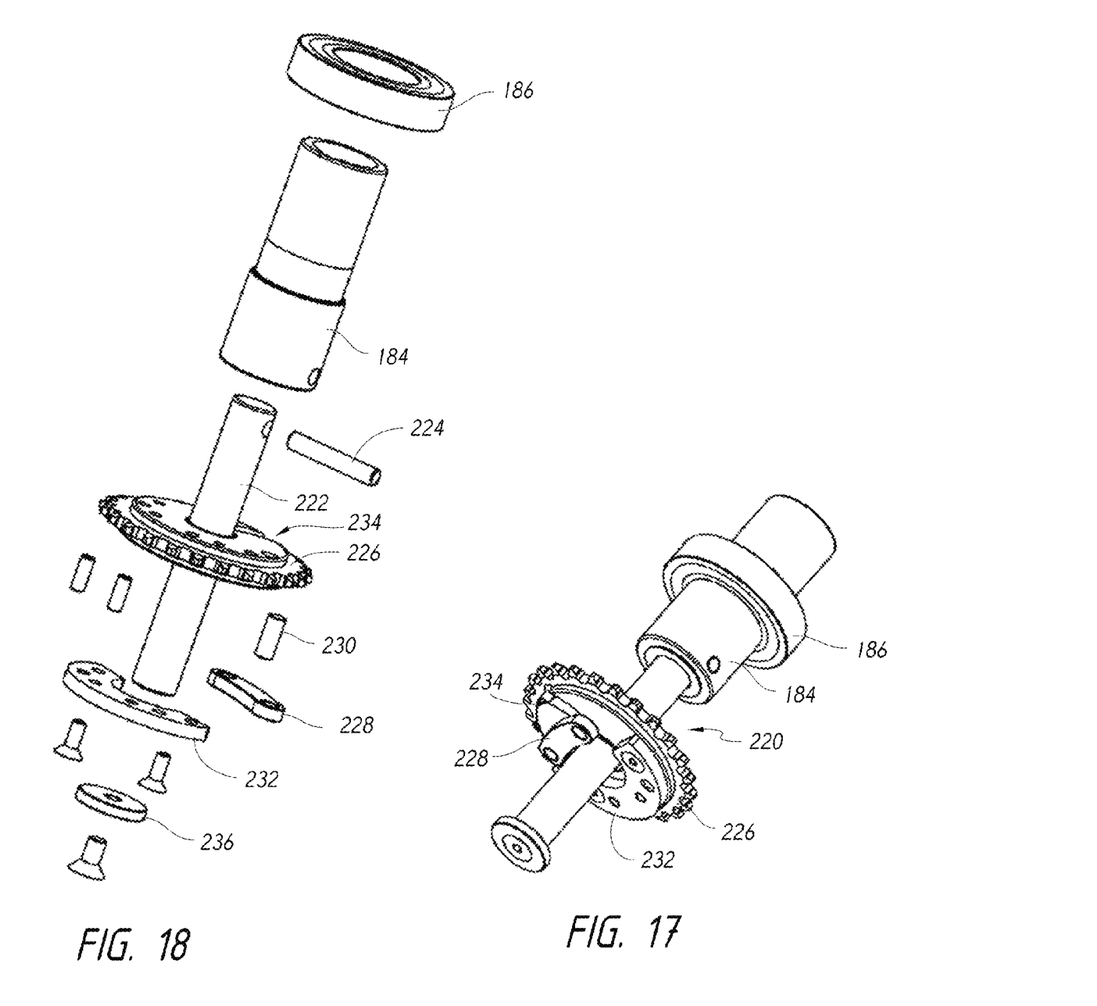
FIG. 17 is a perspective view of the middle sprocket assembly shown in FIG. 14.
FIG. 18 is an exploded perspective view of the middle sprocket assembly shown in FIG. 17.

Referring to FIGS. 15 and 16, the top sprocket assembly 188 has a C-plate 194 rigidly attached to a top sprocket 190 via bolts 214 and/or pins 212. An arm 196 is pivotally attached to the top sprocket 190 on a pivot pin 198. Referring to FIGS. 17 and 18, in the middle sprocket assembly 220, a middle sprocket 226 is rigidly attached to and rotates with the axle 222. Similar to the top sprocket assembly 188, in the middle sprocket assembly 220 a C-plate 232 is rigidly attached to the bottom surface of the middle sprocket 226, and an arm 228 is pivotally pinned or attached the bottom surface of the middle sprocket 226. A sprocket through slot 234 in the middle sprocket 226 extends generally radially outwardly from near the axle 222 to near the teeth on the outer circumference of the sprocket 226.

Figures 19, 20, 21:
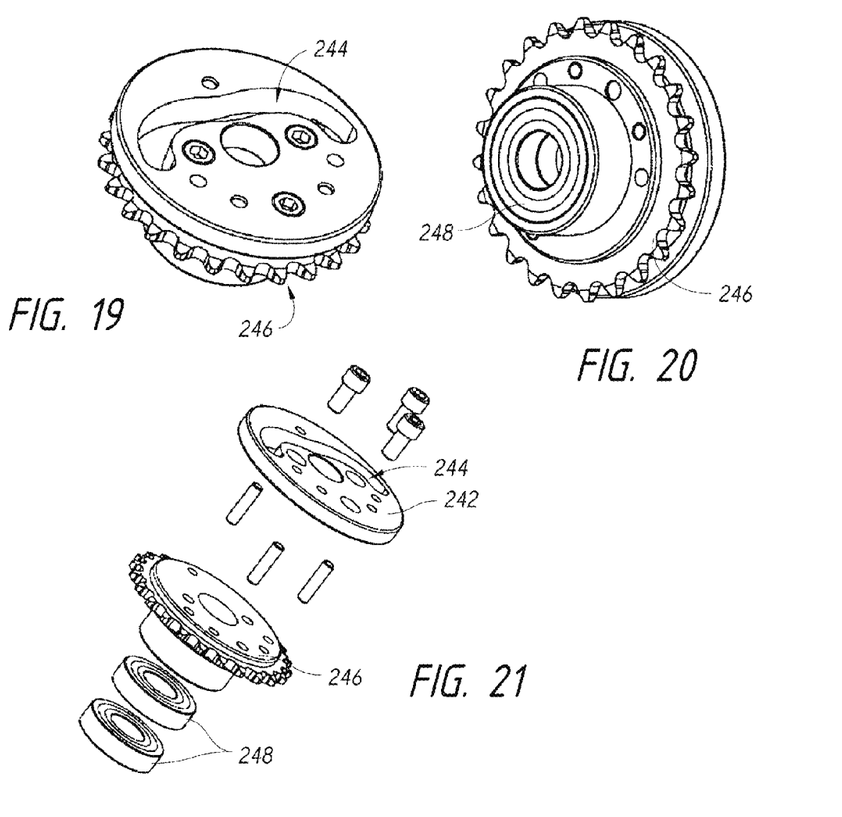
FIG. 19 is a top perspective view of the bottom sprocket assembly shown in FIG. 14.
FIG. 20 is a bottom perspective view of the bottom sprocket assembly shown in FIGS. 14 and 19.
FIG. 21 is an exploded perspective view of the bottom sprocket assembly shown in FIGS. 19 and 20.
Figures 22, 23, 24:
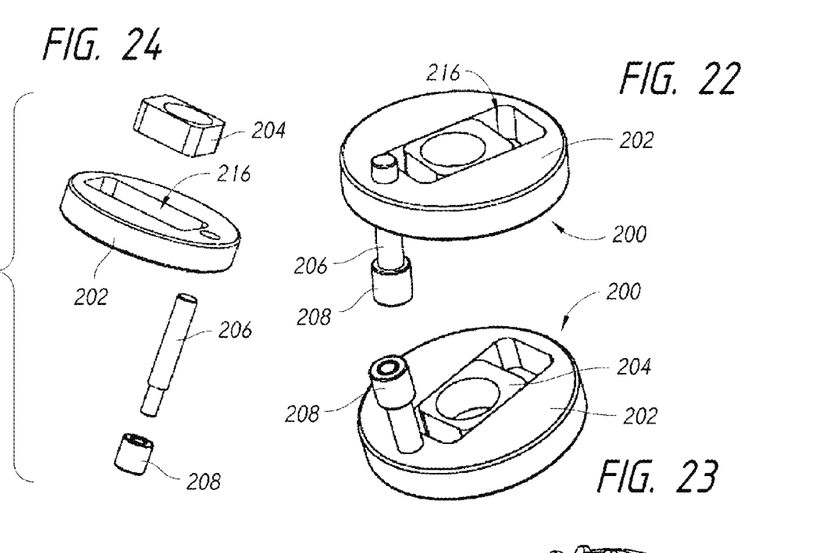
FIG. 22 is a top perspective view of the differential shown in FIG. 14.
FIG. 23 is a bottom perspective view of the differential shown in FIGS. 14 and 22.
FIG. 24 is an exploded perspective view of the differential shown in FIGS. 14, 22 and 23.

As shown in FIG. 20, the bottom sprocket 246 is rotatably mounted on bearings 248 on the axle 222 so that it can rotate free of the axle. As shown in FIG. 19 a contoured roller slot 244 is provided in the top surface of the bottom sprocket 246. Referring to FIGS. 14 and 22-24, a differential 200 is provided between the top and middle sprockets. The differential 200 may include a slider 204 which slides in a slot 216 in a differential plate 202. The axle 222 extends through a central clearance opening in the slider 204, holding the slider 204 in a central position while allowing the axle 222 to rotate relative to the slider 204, and allowing the differential plate 202 to shift into off-center positions. A roller pin 206 rigidly attached to the outer end of the arm 196, extends down through the sprocket slot 234 in the middle sprocket 226 and through a clearance hole in the outer end of the arm 228, with a roller 208 rotatably attached onto the lower end of the pin 206 positioned in the roller slot 244 in the top surface of the bottom sprocket 246. The shape of the roller slot 244 which provides corrective steering, may be determined directly based on the lateral wheelbase or spacing between the steering axis of the left side and right side leg assemblies, by sequentially plotting points that provide steering geometry as shown in FIG. 47A of U.S. Pat. No. 6,520,642.

Turning back to FIG. 14, a fork ring 266 has shift pins 268 projecting up through holes in the bottom sprocket 246. A fork 250 has rollers 252 positioned within a groove in the fork ring 266. A shaft 254 attached to the fork 250 has a lead screw 256 engaged with a fork lever 258. Turning the fork lever 258, e.g., ¼ turn, lifts and lowers the fork 250, moving the fork ring 266 into an up position, where the shift pins 268 extend into holes in the middle sprocket 226, and moving the fork ring 266 into a down position, where the shift pins 268 are withdrawn from the middle sprocket 226. Lock pins 270 extend down from the bottom surface of the fork ring 266. With the fork ring 266 in the down position, the lock pins project into openings in the bottom plate 82, locking the fork ring 266, and the bottom sprocket 246, so that they cannot rotate. With the fork ring 266 in the up position the lock pins 270 are withdrawn from the openings in the bottom plate so that the fork ring 266 and the bottom sprocket 246 are free to rotate.

Camera dollies often have steering systems to provide corrective steering or crab steering, or both. The steering geometry and principles of these steering modes are described in U.S. Pat. No. 6,520,642, incorporated herein by reference.

Figure 25:
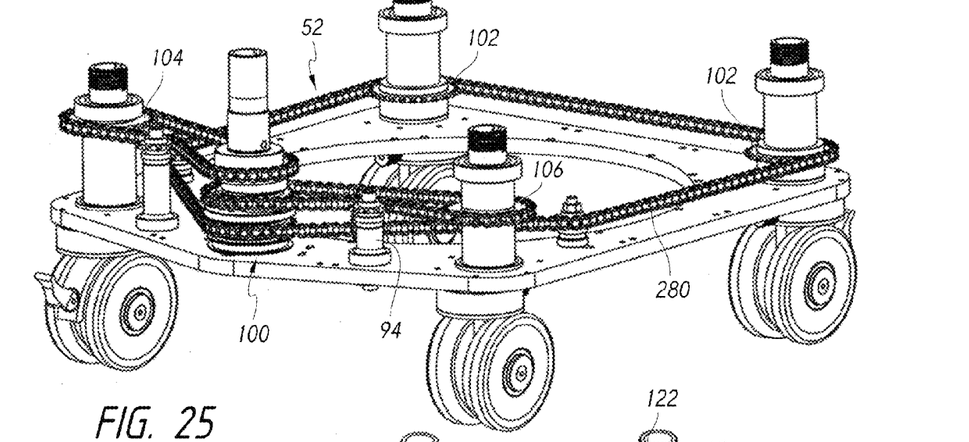
FIG. 25 is top, rear and right side view of the base shown in FIGS. 2 and 4, with components removed for clarity of illustration.
Figure 26:
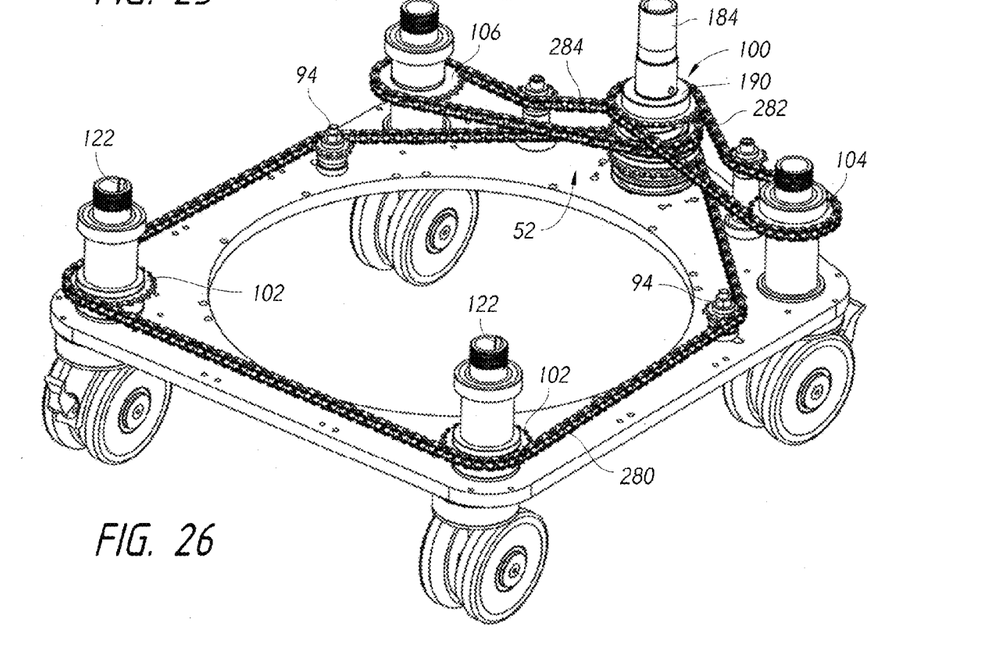
FIG. 26 is top, front and left side view of the base shown in FIGS. 2 and 4, with components removed for clarity of illustration.

As shown in FIGS. 25 and 26 the steering system 52 has a crab chain 280, a left chain 282 and a right chain 284. The crab chain 280 extends continuously around the front sprockets 102 on the left and right front leg assemblies 96 and also around the bottom sprocket 246 of the steering transmission. The left chain 282 extends continuously around the left rear sprocket 104 and around the top sprocket 190 of the steering transmission 100. The right chain 284 extends continuously around the right rear sprocket 106 and around the middle sprocket 226 of the steering transmission 100. Idlers 94 are provided to maintain the chains appropriately tensioned and positioned. As shown in FIGS. 25 and 26, the front sprockets 102 are both at a low vertical position on the leg assembly 96, the right rear sprocket 106 is at an intermediate vertical position and the left rear sprocket 104 is at a high vertical position. The chains 280, 282 and 284 are at corresponding vertical positions, to provide clearance between them.

Figures 8, 9:
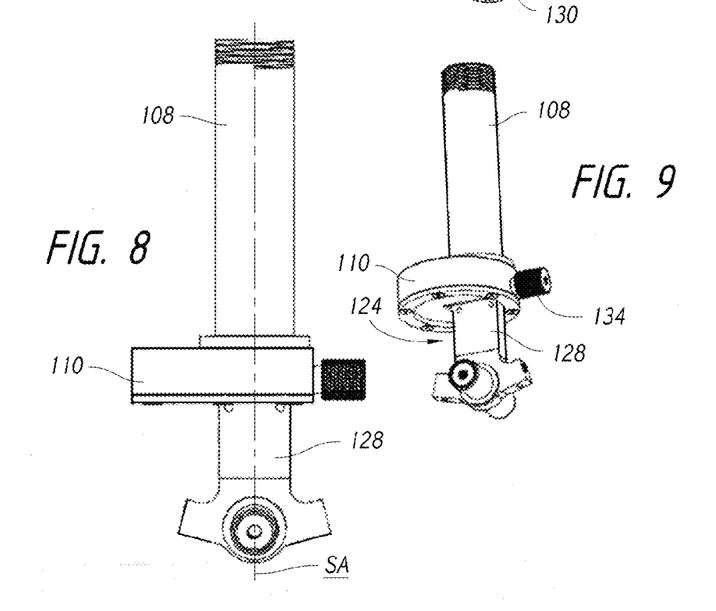
FIG. 8 is a side view of the leg assembly of FIG. 5 in the steer position, with components omitted for purpose of illustration.
FIG. 9 is a perspective view of the leg assembly shown in FIG. 8.

The steering system 52 is engaged by locking the cam locks 120. At each ci leg assembly 96, locking the cam lock 120 clamps the sprocket 102, 104 or 106 of the leg assembly to the riser 108 so that they both rotate together. The wheels are aligned in the straight ahead position before locking the cam locks 120. The steering bar 70 is inserted into the shaft 184 with the key 72 in the keyway 122, so that rotating the steering bar 70 rotates the shaft 184 and the axle 222. The leg assemblies 96 are in the normal position as shown in. FIGS. 8 and 9, with the axles 130 on the centerline of the riser 108.

For crab steering, where all of the wheel sets are steered to the same angle, the shift lever 258 is turned to move the fork ring 266 into the up position. The lock pins 270 are withdrawn from the openings in the bottom plate 82, or other fixed element, so that the bottom sprocket can freely rotate. Turning movement of the steering bar turns the axle 222 and the middle sprocket 226. Since the shift pins 268 lock the bottom sprocket 246 to the middle sprocket 226, turning the steering bar 70 rotates the bottom sprocket which drives the crab chain, causing both front wheels to steer to the same angle. At the same time, the right rear sprocket 106 is also steered to the same angle as the front wheels via the middle sprocket driving the right chain 284. Similarly, the top sprocket 190 is rotated along with the middle sprocket 226 via the connection between them formed by the pivoting arms 196 and 228 and the pin 206. The top sprocket drives the left chain 282 and the left rear sprocket 104 also to the same steering angle, so that all four wheel sets are steered to the same angle.

For corrective steering, the shift lever 258 is rotated to move the fork ring 266 into the down position. The fork ring 266 and the bottom sprocket 246 are locked against rotation via the lock pins 270 engaged into holes in the bottom plate 82 or other fixed structure. This locks the front wheel sets into the straight ahead position. Turning the steering bar 70 turns the axle 222 which drives the middle sprocket 220, causing the right rear sprocket 106 and the right rear wheel sets to a first steering angle. The top sprocket 190 is driven through the differential 200 to a corrected steering angle via the roller 208 moving in the roller slot 244. The left rear sprocket 104 and the left rear wheel sets are consequently steered to a corrected steering angle. The base 50 therefore achieves corrected steering so that the wheels track precisely with little or no slipping or skidding as the base moves in a curved path.

The base 50 may also be steered by inserting the steering bar 70 into the riser 108 or any one of the four leg assemblies 96. This allows the operator to steer the base 50 from any one of five different positions. The steering bar 70 is very quickly and easily inserted and removed since no screw thread or other fittings are used. Rather the steering bar 70 is simply inserted and turned to engage the keyway. The shift lever 258 may also have a third position where the axle 222 is locked out against rotation, thereby locking all of the wheels at a fixed steering angle, typically at the straight ahead steering angle.

The steering system 52 is disengaged when the operator wants to use the base 50 as a caster mode pedestal, which is simply pushed and not steered. The cam locks 120 are released or unlocked, by lifting the levers 156, allowing the leg assembly 96 to rotate independently of the sprocket 102, 104 or 106. The thumb screw 140 on each leg assembly 96 is loosened. The axle frame 124 is turned ½ turn, from the normal position shown in FIGS. 6 and 7 to the caster or offset position shown in FIGS. 8 and 9. The thumb screws 140 are retightened. The wheels then act as caster wheels, allowing the base 50 to be pushed in any direction. The offset of the wheel axles 130 from the riser 108 is shown as dimension CC in FIG. 6, with dimension CC typically ranging from about ¾ to 1¼ inches. The pedestal may optionally be temporarily lifted up off of the ground to un-weight the leg assemblies, to make it easier to rotate the axle frames 124 when configuring the pedestal for caster movement.

The base 50 may be compact and lightweight, so that it may be used in confined spaces and be easily lifted and carried by one or two people. For example, in one design the base has a width and length of about 20 inches and weighs about 40 pounds. The base 50 may also be designed so the wheel sets are spaced apart by 16 inches, to allow the base to operate on narrow track. As shown in FIG. 1, the camera 36 may be positioned on the column with the lens 38 aligned with an axis AA passing through the front wheels. Alternatively the camera 36 may be positioned so that the center of the camera coincides with the center of rotation of the base 50 during corrective steering.

Although chains and sprockets are shown and described, they may of course be replaced by belts and pulleys, and especially tooth belts. The specific design of the disk 126 rotatable within the cup 110 to achieve caster offset is provided as an example. Caster offset may alternatively be achieved in other ways using cams, linear tracks, arms similar to arm 128 but having a pivotable joint, arms 128 having dual sets of axles, one set for steering and one for caster operation, etc. These are collectively referred to here as a caster fitting, i.e., a component that allows switching between normal and caster positions. The claims below encompass these alternatives as well. The terms sprocket and chain in the claims include use of pulleys and belts. The terms rotatable and rotatably refer to turning movement, which may be greater than or less than 360 degree movement. The steering transmission 100 may be replaced with various other types of steering transmissions, for example as described in U.S. Pat. No. 6,520,642, or steering transmissions providing similar steering functions using gears, cams, levers, or other elements.

Thus, a novel camera pedestal and base have been shown and described. Various changes and modifications may of course be made without departing from the spirit and scope of the invention. The invention, therefore, should not be limited, except by the following claims and their equivalents.

The invention claimed is:
1. A camera pedestal comprising:
a base having a chassis;
first, second, third and fourth leg assemblies having a first component rotatably attached to the chassis on a steering axis, and a second component attached to the first component;

at least one axle on the second component and at least one wheel rotatably attached onto the at least one axle;

with the second component moveable relative to the first component into a first position wherein the at least one axle is aligned on the steering axis, and into a second position wherein the at least one axle is offset from the steering axis; and with the first component comprising a hollow tubular upright, further including a leg sprocket on the upright and a chain extending around the leg sprocket and around a transmission sprocket in a steering transmission in the chassis.

2. The camera pedestal of claim 1 with the at least one axle offset from the steering axis by 0.05 to 2.0 inches.

3. The camera pedestal of claim 1 with the chassis having four corners and with a leg assembly at each of the corners.

4. The camera pedestal of claim 1 with the first and second components comprising a disk rotatably retained with a cup, and with a fastener movable to lock the disk against rotation in the cup, and also movable to allow the disk to rotate freely in the cup.

5. The camera pedestal of claim 1 further including a leg sprocket locking mechanism movable to a lock position wherein the leg sprocket is locked onto the upright, and a release position wherein the upright can rotate free of the leg sprocket.

6. The camera pedestal of claim 1 further comprising a column or riser on the base.

7. The camera pedestal of claim 1 further comprising a telescoping column having a lower end in a receptacle in the base.

8. The camera pedestal of claim 1 further comprising a cylindrical sprocket housing around each leg sprocket, and with the sprocket housings forming corners of the chassis.

9. The camera pedestal of claim 1 with the steering transmission shiftable into a corrective steering mode and into a crab steering mode.

10. A camera support comprising:

a chassis with first, second, third and fourth leg assemblies rotatably attached to the chassis;

a wheel set rotatably attached onto a lower end of each leg assembly;

a caster fitting on each leg assembly for positioning the wheel set into a normal position and into a caster position;

a leg sprocket on each leg assembly and a sprocket locking mechanism on each leg assembly for locking the leg sprocket for rotation with the leg assembly, and for releasing the leg sprocket to allow the leg assembly to rotate freely of the leg sprocket; and a steering transmission in the chassis having a first chain extending around the leg sprockets of the first and second leg assemblies, a second chain extending around the leg sprocket of the third leg assembly, and a third chain extending around the leg sprocket of the fourth leg assembly.

11. The camera pedestal of claim 10 with the chassis having a front and a back, and with the steering transmission at the back of the chassis, and with the first and second leg assemblies at the front left and front right of the chassis.

12. The camera pedestal of claim 10 with the caster fitting comprising a cup joined to a lower end of a tubular riser, and a disk on an upper end of an axle frame, with the disk retained in the cup and movable relative to the cup to position a wheel axle on the axle frame into a normal position wherein the axle intersects a centerline of the tubular riser, and to position the wheel axle in a caster position wherein the axle is offset from the centerline of the tubular riser.

13. The camera pedestal of claim 10 with the sprocket locking mechanism comprising a cam lock threaded onto an upper end of the leg assembly.

14. The camera pedestal of claim 10 with the chassis having a central opening for receiving a column.

15. A camera pedestal comprising:

a base having a chassis;

first, second, third and fourth leg assemblies having a hollow tubular upright rotatably attached to the chassis on a steering axis, with the hollow tubular upright extending vertically entirely through the chassis, with the hollow tubular upright having an open top end and a key or keyway for engaging a steering bar;

and a caster fitting attached to the hollow tubular upright and at least one axle on the caster fitting and at least one wheel rotatably attached onto the at least one axle;

with the caster fitting moveable relative to the hollow tubular upright into a first position wherein the at least one axle is aligned on the steering axis, and into a second position wherein the at least one axle is offset from the steering axis; and a leg sprocket on the hollow tubular upright and a chain extending around the leg sprocket and around a transmission sprocket in a steering transmission in the chassis.

\* \* \* \* \*